United States Patent
Putman et al.

(10) Patent No.: US 10,121,210 B2
(45) Date of Patent: Nov. 6, 2018

(54) TRACKING POWER STATES OF A PERIPHERAL DEVICE

(71) Applicant: Apple Inc., Cupertino, CA (US)

(72) Inventors: Andrew D. Putman, San Francisco, CA (US); Jesse M. Devine, Campbell, CA (US)

(73) Assignee: Apple Inc., Cupertino, CA (US)

( * ) Notice: Subject to any disclaimer, the term of this patent is extended or adjusted under 35 U.S.C. 154(b) by 952 days.

(21) Appl. No.: 13/627,210

(22) Filed: Sep. 26, 2012

(65) Prior Publication Data

US 2014/0067295 A1 Mar. 6, 2014

Related U.S. Application Data (60) Provisional application No. 61/697,176, filed on Sep. 5, 2012.

(51) Int. Cl.
*G06Q 50/06* (2012.01)

(52) U.S. Cl.
CPC ........... *G06Q 50/06* (2013.01); *Y02B 90/245* (2013.01); *Y04S 20/40* (2013.01)

(58) Field of Classification Search
CPC . G06Q 50/06; H04W 52/0296; Y02B 90/245; Y04S 20/40
USPC ............................................ 702/61; 713/340
See application file for complete search history.

(56) References Cited

U.S. PATENT DOCUMENTS

| | | | | |
|---|---|---|---|---|
| 7,260,359 | B2 * | 8/2007 | Boetzel | H04B 7/269 370/321 |
| 7,333,785 | B1 * | 2/2008 | Lavelle | H04W 52/028 455/127.5 |
| 7,636,042 | B2 * | 12/2009 | Hameed | G06F 1/3215 340/3.71 |
| 8,806,246 | B1 * | 8/2014 | Wu | G06F 9/4893 455/205 |
| 2002/0178387 | A1 * | 11/2002 | Theron | G06F 1/32 713/300 |
| 2003/0009705 | A1 * | 1/2003 | Thelander | G06F 1/3203 713/340 |

(Continued)

FOREIGN PATENT DOCUMENTS

WO    WO 03007135 A2 *    1/2003    .......... G06F 1/3203

*Primary Examiner* — Alexander Satanovsky
*Assistant Examiner* — Lina Cordero
(74) *Attorney, Agent, or Firm* — Blank Rome LLP (57) ABSTRACT

During operation, an electronic device monitors data associated with different power states received from another electronic device via an interface circuit. Using the monitored data, the electronic device calculates a time duration that the other electronic device is in an active operating mode. Moreover, the electronic device determines power states of the other electronic device based on the calculated time duration and/or a time duration between times when data is received. Next, the electronic device calculates the power-consumption history of the other electronic device based on the determined power states and at least a model of power consumption in different power states of the other electronic device. By calculating the power-consumption history of the other electronic device, the electronic device may significantly improve the accuracy of a power-usage model for the other electronic device.

19 Claims, 5 Drawing Sheets

(56) References Cited

U.S. PATENT DOCUMENTS

| | | | |
|---|---|---|---|
| 2003/0067961 A1* | 4/2003 | Hudson | H04B 1/7103 375/130 |
| 2005/0210161 A1* | 9/2005 | Guignard | G06F 11/008 710/15 |
| 2005/0240786 A1* | 10/2005 | Ranganathan | G06F 1/3215 713/320 |
| 2006/0140218 A1* | 6/2006 | Winterton | H04L 1/0007 370/476 |
| 2009/0215402 A1* | 8/2009 | Ng | G06F 1/3203 455/69 |
| 2009/0249090 A1* | 10/2009 | Schmitz | G06F 1/3203 713/300 |
| 2010/0104907 A1* | 4/2010 | Aoki et al. | 429/23 |
| 2010/0106994 A1* | 4/2010 | Challener | G06F 1/3203 713/330 |
| 2010/0130263 A1* | 5/2010 | Zhang et al. | 455/572 |
| 2010/0141762 A1* | 6/2010 | Siann | H04N 7/185 348/143 |
| 2010/0235007 A1* | 9/2010 | Constien | G01R 31/3679 700/291 |
| 2010/0241888 A1* | 9/2010 | Kaneko | G06F 1/3203 713/324 |
| 2011/0125482 A1* | 5/2011 | Michelson | G06F 11/3058 703/21 |
| 2011/0143699 A1* | 6/2011 | Noh et al. | 455/127.1 |
| 2011/0151943 A1* | 6/2011 | Lee | 455/573 |
| 2012/0005490 A1* | 1/2012 | Goraczko | G06F 1/3206 713/300 |
| 2012/0133484 A1* | 5/2012 | Griffin | G06F 21/51 340/5.54 |
| 2012/0135696 A1* | 5/2012 | Lerzer et al. | 455/127.1 |
| 2012/0147802 A1* | 6/2012 | Ukita | H04W 52/0216 370/311 |
| 2012/0198262 A1* | 8/2012 | Sauerwein et al. | 713/340 |
| 2012/0254633 A1* | 10/2012 | Vilhauer | G06F 1/3212 713/300 |
| 2013/0031385 A1* | 1/2013 | Seto | G06F 1/28 713/300 |
| 2013/0152014 A1* | 6/2013 | Rabii et al. | 715/785 |

* cited by examiner

TRACKING POWER STATES OF A PERIPHERAL DEVICE

CROSS REFERENCE TO RELATED APPLICATIONS

This application claims priority under 35 U.S.C. § 119(e) to U.S. Provisional Application Ser. No. 61/697,176, entitled "Tracking Power States of a Peripheral Device," by Andrew D. Putman and Jesse M. Devine, filed on Sep. 5, 2012, the contents of which is herein incorporated by reference.

This application is also related to: U.S. Provisional Patent Application Ser. No. 61/697,172, entitled "Power Sub-State Monitoring," by Nima Parivar, Christopher T. Mullens and Kelsey Y. Ho, filed Sep. 5, 2012, the contents of which are herein incorporated by reference.

BACKGROUND

Field

The described embodiments relate to techniques for tracking the power states and power consumption of an electronic device.

Related Art

A power-usage model is often used while designing electronic devices (such as mice, trackpads, touchscreens, etc.). For example, a power-usage model can be used to provide information about how the electronic device will be used, so that an accurate power budget or battery-life estimate can be calculated. As a consequence, a power-usage model (and the related power budget) directly impacts the design of an electronic device, including the battery size, as well as the size and the shape of the product.

In addition, a power-usage model may be incorporated into a battery model in order to predict remaining battery life. This prediction may be presented to a user of the electronic device, for example, in the form of a remaining time/percentage display or low/critical battery-level notifications.

However, constructing an accurate power-usage model for sophisticated electronic devices can be difficult because users are typically free to use these electronic devices in arbitrary and unexpected ways. Therefore, power-usage models are often constructed by making educated guesses, looking at historical data, or observing users as they interact with electronic devices. These approaches are often inaccurate, which can require more conservative designs (such as electronic devices with larger, heavier batteries) and can make it more difficult to predict the remaining battery life.

SUMMARY

The described embodiments include an electronic device that calculates a power-consumption history of another electronic device. During operation, the electronic device monitors information received from the other electronic device via an interface circuit. Then, the electronic device calculates a time duration that the other electronic device is in an active operating mode based on the monitored information. Moreover, the electronic device determines power states of the other electronic device based on the calculated time duration. Next, the electronic device calculates the power-consumption history of the other electronic device based on the determined power states and at least a model of power consumption in different power states of the other electronic device.

Note that determining the power states may involve determining power sub-states within an operating mode of the electronic device after an instance of the active operating mode has ceased and before a subsequent instance of the active operating mode begins. Moreover, an instance of the active operating mode may be associated with receiving information from the other electronic device.

In some embodiments, the electronic device modifies a user experience based on the calculated power-consumption history. For example, the electronic device may include a power source, and the user experience may include an operating time before the power source is recharged. Alternatively or additionally, modifying the user experience may involve changing a performance of the electronic device.

Additionally, the electronic device may store the calculated power-consumption history in a memory in the electronic device.

Furthermore, the information may include data associated with different components in the other electronic device, and the power-consumption history of the other electronic device may be calculated based on the determined power states and models of the power consumption in different power states of the different components in the other electronic device.

In some embodiments, the information includes bursts of data, such as streams of data. Note that the other electronic device may be in the active operating mode when data is received and may be: in an idle mode when data is not received; in another operating mode, which is other than an idle mode, during time intervals between when data is received; or in the other operating mode when time-invariant data is received.

Another embodiment provides a method that includes at least some of the operations performed by the electronic device.

Another embodiment provides a computer-program product for use with the electronic device. This computer-program product includes instructions for at least some of the operations performed by the electronic device.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
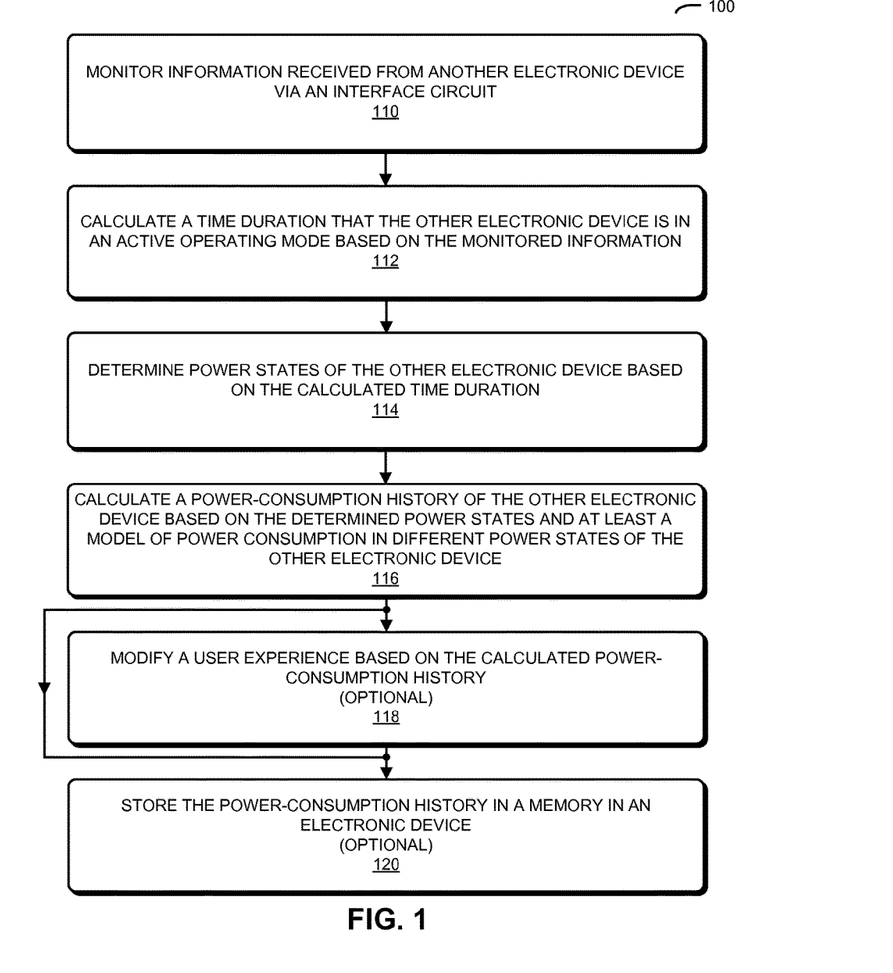
FIG. 1 is a flowchart illustrating a method for calculating a power-consumption history of another electronic device in accordance with an embodiment of the present disclosure.
Figure 4:
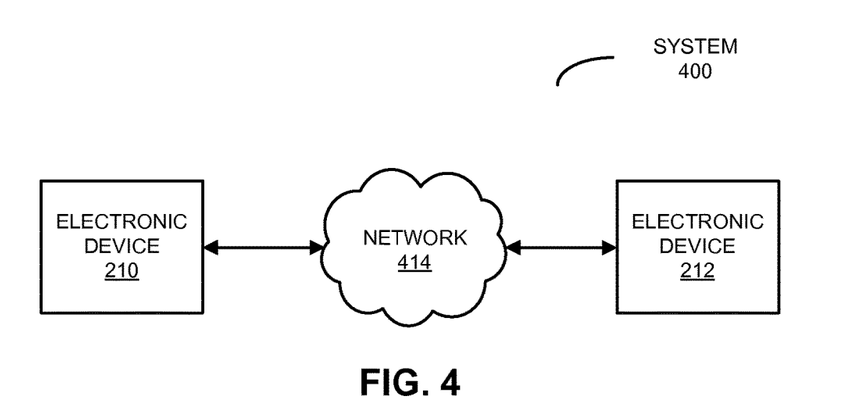
FIG. 4 is a block diagram illustrating a system that performs the method of FIGS. 1 and 2 in accordance with an embodiment of the present disclosure.
Figure 5:
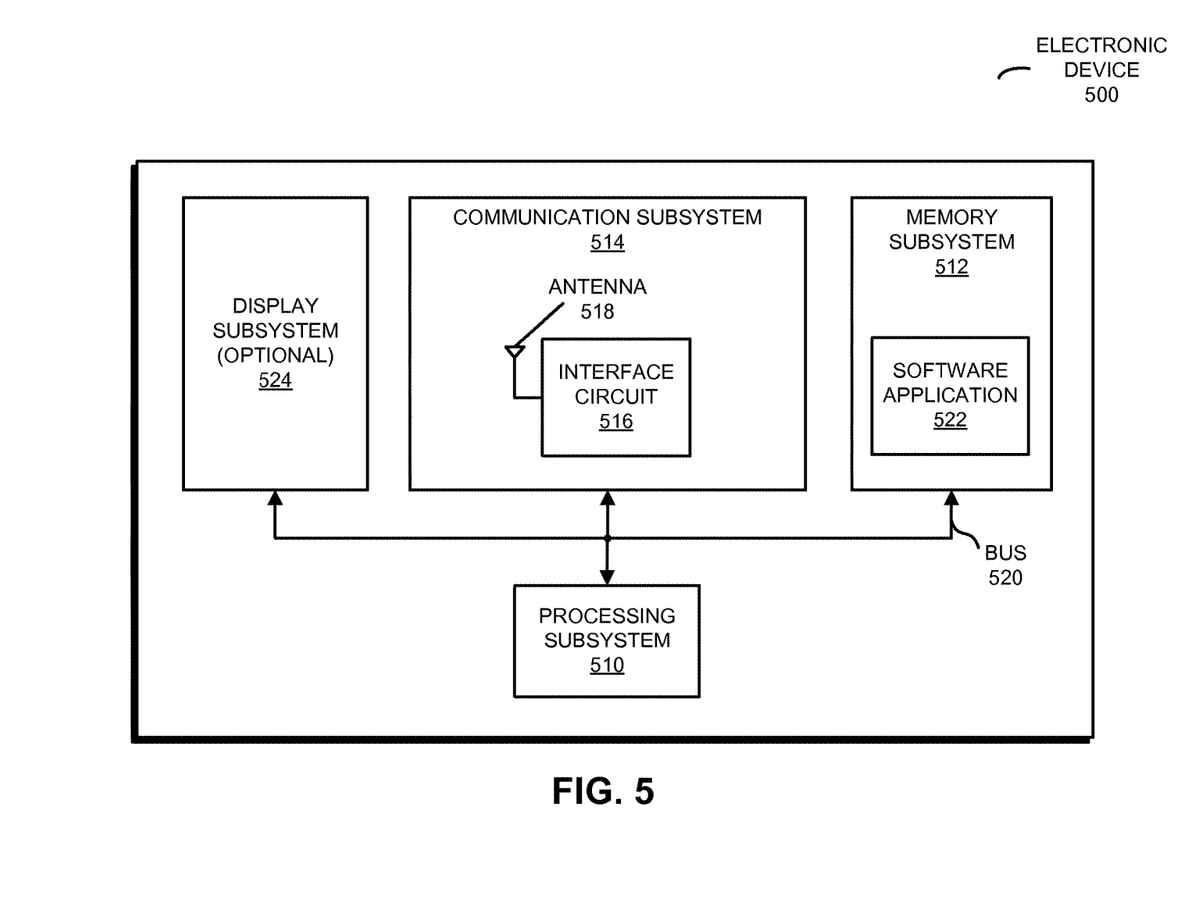
FIG. 5 is a block diagram illustrating an electronic device in the system of FIG. 4 in accordance with an embodiment of the present disclosure.

FIG. 1 presents a flowchart illustrating a method 100 for calculating a power-consumption history of another electronic device, which may be performed by electronic device 212 (FIGS. 2 and 4) or 500 (FIG. 5). During operation, the electronic device monitors information received from the other electronic device via an interface circuit (operation 110). For example, the information may indicate use of the other electronic device by a user. Then, the electronic device calculates a time duration that the other electronic device is in an active operating mode based on the monitored information (operation 112).

Moreover, the electronic device determines power states of the other electronic device based on the calculated time duration (operation 114). Note that determining the power states may involve determining power sub-states within an operating mode of the electronic device after an instance of the active operating mode has ceased and before a subsequent instance of the active operating mode begins. Moreover, an instance of the active operating mode may be associated with receiving information from the other electronic device.

Next, the electronic device calculates the power-consumption history of the other electronic device based on the determined power states and at least a model of power consumption in different power states of the other electronic device (operation 116). For example, the information may include data associated with different components in the other electronic device, and the power-consumption history of the other electronic device may be calculated based on the determined power states and models of the power consumption in different power states of the different components in the other electronic device.

By calculating the power-consumption history of the other electronic device, the electronic device may significantly improve the accuracy of a power-usage model for the other electronic device.

In some embodiments, the electronic device optionally modifies a user experience based on the calculated power-consumption history (operation 118). For example, the electronic device may include a power source (such as a battery), and modifying the user experience may affect an operating time before the power source is recharged. Alternatively or additionally, modifying the user experience may involve changing a performance of the electronic device, such as a clock speed or a backlight intensity. Thus, the electronic device may reduce the performance to increase the operating time until the power source is recharged. Furthermore, these modifications may be based on a user input or instruction. For example, the user may be provided several user-experience options on a display (such as a touchscreen), such as high performance, short battery life versus reduced performance, longer battery life, and the user may select the user experience that they prefer.

The power-consumption history may be used in a variety of ways. For example, it may be used to debug power issues in engineering and in the field. Moreover, by surveying multiple electronic devices, typical power usage can be determined, which may improve the accuracy of power-usage models and guide improved future product design. Furthermore, the time duration in the different power states may be used to predict the power impact of the other electronic device. For example, a predictive power-management technique may analyze this information in real-time so that more accurate estimates of battery-life consumed (and thus, battery-life remaining) can be presented to a user of the electronic device that includes the other electronic device (e.g., a host). This may also allow the user experience to be modified accordingly, thereby trading off performance with remaining battery power. In addition, the information in the power-consumption history may be analyzed to detect unusual operating conditions, and to take appropriate action (e.g., reset firmware, log a bug, log an error message, etc.). For example, whether the other electronic device is consuming more power than expected can be detected (based on the known power consumption in different power states, which may be determined by a manufacturer of the other electronic device) and remedial action may be taken.

Additionally, the electronic device may optionally store the calculated power-consumption history in a memory in the electronic device (operation 120). This may allow the power-consumption history to be used by other applications executing on the electronic device, such as a power-management module.

Figure 2:
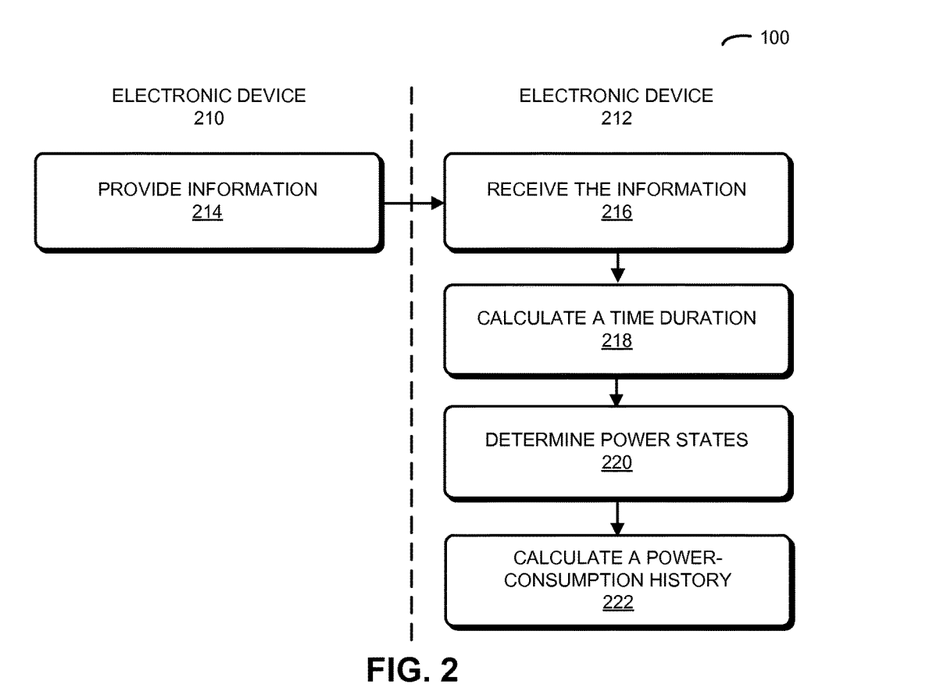
FIG. 2 is a drawing illustrating the method of FIG. 1 in accordance with an embodiment of the present disclosure.

In an exemplary embodiment, the power-monitoring technique is implemented using a computer (such as a host) that interacts or communicates with at least one peripheral device, for example, via a link, such as a signal line. (However, more generally, the computer and the peripheral device can communicate via a network, such as a cellular-telephone network and/or the Internet). This is illustrated in FIG. 2, which presents a drawing illustrating method 100. During this method, electronic device 210 provides information (operation 214), which is received by electronic device 212 (operation 216). Using this information, electronic device 212 calculates a time duration (operation 218) that electronic device 210 is in an active operating mode.

Then, electronic device 212 determines power states (operation 220) of electronic device 210 based on the calculated time duration. Next, electronic device 212 calculates a power-consumption history (operation 222) of electronic device 210 based on the determined power states and at least a model of power consumption in different power states of electronic device 210.

In some embodiments of method 100, there may be additional or fewer operations. Moreover, the order of the operations may be changed, and/or two or more operations may be combined into a single operation.

In an exemplary embodiment, electronic device 212 inspects incoming data from electronic device 210, such as a peripheral device. Based on the type of data that is sent, electronic device 212 records the time when a user began using the peripheral device, and the length of time the peripheral device was in use. For a peripheral device with multiple modules and, thus, multiple power states to track, electronic device 212 may log usage specific to a given module and/or additional data (e.g., number of fingers present on a trackpad). In general, the power state of electronic device 210 may be affected by the host machine in electronic device 210. Therefore, electronic device 212 may also log system power states in addition to usage of electronic device 210 (e.g., sleep, wake, shutdown).

Using the usage log, electronic device 212 can determine how long a user spent in a specific power state or what power state a given module was in at a particular time. Then, using one or more models of power consumption based on behavior or power states of electronic device 210, electronic device 212 can determine the power-consumption history of electronic device 210.

Note that new power-consumption models can be dynamically uploaded by electronic device 212, and these power-consumption models can be used to analyze existing usage logs. This may allow the impact of a new power-consumption model to be assessed.

Figure 3:
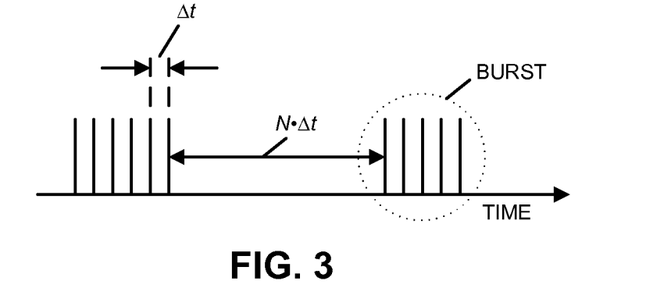
FIG. 3 is a drawing of data communicated between electronic devices in accordance with an embodiment of the present disclosure.

As an illustration, electronic device 210 may be a Universal Serial Bus mouse. In this case, the data monitored by electronic device 212 may reflect usage of electronic device 210, i.e., electronic device 212 may implement an activity monitor. Therefore, electronic device 212 may determine if electronic device 210 is 'connected' or 'disconnected.' If electronic device 210 is connected, it may be in an active operating mode or an idle operating mode. When it is in the active operating mode, electronic device 210 may transmit episodic bursts of data that describe motion of the mouse. This is illustrated in FIG. 3, which presents a drawing of data communicated between electronic devices. In the case of a Universal Serial Bus mouse, the time interval ($\Delta t$) may be approximately 8 ms, and bursts of data may be transmitted over longer time scales (i.e., a multiple of $\Delta t$).

When no data is received for 0.5 s, then electronic device 210 may be in an idle operating mode. Therefore, power consumption of electronic device 210 can be coarsely determined from the time duration of data and the time duration between when data is received.

However, if electronic device 210 is a Bluetooth™ mouse, there may be additional power sub-states within the idle operating mode that may be inferred based on elapsed time as electronic device 210 cascades through additional low-power sub-states. For example, in the idle operating mode, electronic device 210 may be in a first low-power sub-state for 1 s, then in a second low-power sub-state for 2 s, etc. Therefore, power consumption of electronic device 210 can be coarsely determined from the determined time durations and a more detailed model of the power sub-state cascade and timing. Note that for Bluetooth™ communication, $\Delta t$ may be approximately 11.25 ms.

In another example, electronic device 210 may be a multi-touch Bluetooth™ trackpad. In this case, significant power is consumed during the active operating mode when data is transmitted. In addition, there may be multiple power sub-states during which no data or limited data is transmitted. For example, if the user's finger(s) are in contact with the trackpad and moving, data may be transmitted in bursts (i.e., the active operating mode). If the user's finger(s) are in contact with the trackpad but are not moving, time-invariant data may be transmitted (e.g., the trackpad may be in a low-power sub-state in the active operating mode). Furthermore, if the user's finger(s) are not in contact with the trackpad, no data may be transmitted (i.e., the trackpad may be in the idle operating mode and may cascade through a series of low-power sub-states as time elapses). Thus, once again power consumption of electronic device 210 can be coarsely determined from the determined time durations and a more detailed model of the power sub-state cascade and timing.

In yet another example, electronic device 210 may be a multi-touch Bluetooth™ mouse that can transmit optical data and/or multi-touch data. As a consequence, there can be multiple power sub-states in both the active operating mode and the idle operating mode. For example, there may be an active operating mode for optical, an active operating mode for multi-touch, an idle operating mode for optical and an idle operating mode for multi-touch. Therefore, power consumption of electronic device 210 can be coarsely determined from the time durations and more detailed models of the power sub-state cascaded hierarchies and timing of the optical and multi-touch modules.

One or more of the preceding embodiments of the electronic device may be included in a system. This is shown in FIG. 4, which presents a block diagram illustrating a system 400 that performs method 100 (FIGS. 1 and 2). This system includes electronic device 212 (such as a host) and electronic device 210 (such as a peripheral device). In this system, a software product, such as a software application that is resident on and that executes on electronic device 212, may be used to implement the power-monitoring technique. Note that this software application may be a stand-alone application or a portion of another application that is resident on and which executes on electronic device 212.

As discussed previously, the software application may monitor information received from electronic device 210. For example, electronic device 210 may include a touchscreen, and the information may include bursts of data that indicate that the touchscreen is in an active operating mode. When data is not received from electronic device 210, the touchscreen may be in an idle mode or another operating mode. Alternatively, when time-invariant data is received from electronic device 210, the touchscreen may be in the other operating mode. Note that the information or data may be received by electronic device 212 via network 414, which may include a signal line, a wireless connection, an optical connection, a cellular-telephone network and/or the Internet.

Using the monitored information, the software application may calculate a time duration that electronic device 210 is in the active operating mode. Then, the software application determines power states of electronic device 210 based on the calculated time duration. Next, the software application calculates the power-consumption history of electronic device 210 based on the determined power states and at least a model of power consumption in different power states of electronic device 210.

Note that information in system 400 may be stored at one or more locations in system 400 (i.e., locally or remotely). Moreover, because this data may be sensitive in nature, it may be encrypted. For example, stored data and/or data communicated via network 414 may be encrypted.

FIG. 5 presents a block diagram illustrating an electronic device 500, such as electronic device 212 (FIGS. 2 and 4). This electronic device includes processing subsystem 510, memory subsystem 512, and communication subsystem 514. Processing subsystem 510 includes one or more devices configured to perform computational operations. For example, processing subsystem 510 can include one or more microprocessors, application-specific integrated circuits (ASICs), microcontrollers, programmable-logic devices, and/or one or more digital signal processors (DSPs).

Memory subsystem 512 includes one or more devices for storing data and/or instructions for processing subsystem 510 and communication subsystem 514. For example, memory subsystem 512 can include dynamic random access memory (DRAM), static random access memory (SRAM), and/or other types of memory. In some embodiments, instructions for processing subsystem 510 in memory subsystem 512 include: one or more program modules or sets of instructions (such as software application 522), which may be executed by processing subsystem 510. Note that the one or more computer programs may constitute a computer-program mechanism. Moreover, instructions in the various modules in memory subsystem 512 may be implemented in: a high-level procedural language, an object-oriented programming language, and/or in an assembly or machine language. Furthermore, the programming language may be compiled or interpreted, e.g., configurable or configured, to be executed by processing subsystem 510.

In addition, memory subsystem 512 can include mechanisms for controlling access to the memory. In some embodiments, memory subsystem 512 includes a memory hierarchy that comprises one or more caches coupled to a memory in electronic device 500. In some of these embodiments, one or more of the caches is located in processing subsystem 510.

In some embodiments, memory subsystem 512 is coupled to one or more high-capacity mass-storage devices (not shown). For example, memory subsystem 512 can be coupled to a magnetic or optical drive, a solid-state drive, or another type of mass-storage device. In these embodiments, memory subsystem 512 can be used by electronic device 500 as fast-access storage for often-used data, while the mass-storage device is used to store less frequently used data.

Communication subsystem 514 includes one or more devices configured to couple to and communicate on a wired and/or wireless network (i.e., to perform network operations), including: an interface circuit 516 and an optional antenna 518. For example, communication subsystem 514 can include a Bluetooth™ networking system, a cellular networking system (e.g., a 3G/4G network such as UMTS, LTE, etc.), a Universal Serial Bus (USB) networking system, a networking system based on the standards described in IEEE 802.11 (e.g., a Wi-Fi networking system), an Ethernet networking system, and/or another networking system.

Communication subsystem 514 can include processors, controllers, radios/antennas, sockets/plugs, and/or other devices used for coupling to, communicating on, and handling data and events for each supported networking system. Moreover, in some embodiments a 'network' between the electronic devices does not yet exist. Therefore, electronic device 500 may use the mechanisms in communication subsystem 514 for performing simple wireless communication between the electronic devices, e.g., transmitting advertising frames and/or scanning for advertising frames transmitted by other electronic devices.

Within electronic device 500, processing subsystem 510, memory subsystem 512, and communication subsystem 514 are coupled together using bus 520. Bus 520 may include an electrical, optical, and/or electro-optical connection that the subsystems can use to communicate commands and data among one another. Although only one bus 520 is shown for clarity, different embodiments can include a different number or configuration of electrical, optical, and/or electro-optical connections between the subsystems.

Furthermore, in the preceding embodiments, components are shown directly connected to one another or are shown connected via intermediate components. In each instance the method of interconnection, or 'coupling,' establishes some desired communication between two or more circuit nodes, or terminals. Such coupling may often be accomplished using a number of circuit configurations, as will be understood by those of skill in the art; for example, AC coupling and/or DC coupling may be used.

In some embodiments, the electronic device includes an optional display subsystem 524 for displaying information on a display, which may include a display driver and the display, such as a liquid-crystal display, a touchscreen, etc.

Electronic device 500 can be (or can be included in) any electronic device with at least one communication subsystem. For example, electronic device 500 can be (or can be included in): a desktop computer, a laptop computer, a server, a media player (such as an MP3 player), an appliance, a peripheral device (such as a trackpad, a touchscreen, a display, a mouse, a camera, a keyboard, a user-interface device, etc.), a subnotebook/netbook, a tablet computer, a smartphone, a cellular telephone, a piece of testing equipment, a network appliance, a set-top box, a personal digital assistant (PDA), a toy, a controller, a digital signal processor, a game console, a computational engine within an appliance, a consumer-electronic device, a portable computing device, a personal organizer, and/or another electronic device.

Although specific components are used to describe electronic device 500, in alternative embodiments, different components and/or subsystems may be present in electronic device 500. For example, electronic device 500 may include one or more additional processing subsystems 510, memory subsystems 512, communication subsystems 514, and/or optional display subsystems 524. Additionally, one or more of the subsystems may not be present in electronic device 500. Moreover, in some embodiments, electronic device 500 may include one or more additional subsystems that are not shown in FIG. 5. For example, electronic device 500 can include, but is not limited to, a data collection subsystem, an audio and/or video subsystem, an alarm subsystem, a media processing subsystem, and/or an input/output (I/O) subsystem. Also, although separate subsystems are shown in FIG. 5, in some embodiments, some or all of a given subsystem or component can be integrated into one or more of the other subsystems or component(s) in electronic device 500.

Moreover, the circuits and components in electronic device 500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

While some of the operations in the preceding embodiments were implemented in software, in general the operations in the preceding embodiments can be implemented in a wide variety of configurations and architectures. Therefore, some or all of the operations in the preceding embodiments may be performed in hardware, in software or both.

In some embodiments, system 400 (FIG. 4) is a distributed system, so that electronic devices 210 and 212 (FIGS. 2 and 4) are at remote locations from each other. For example, system 400 (FIG. 4) may represent a cellular-telephone system.

Note that an output of a process for designing an integrated circuit, or a portion of an integrated circuit, comprising one or more of the circuits described herein may be a computer-readable medium such as, for example, a magnetic tape or an optical or magnetic disk. The computer-readable medium may be encoded with data structures or other information describing circuitry that may be physically instantiated as an integrated circuit or portion of an integrated circuit. Although various formats may be used for such encoding, these data structures are commonly written in: Caltech Intermediate Format (CIF), CalmaGDS II Stream Format (GDSII) or Electronic Design Interchange Format (EDIF). Those of skill in the art of integrated circuit design can develop such data structures from schematics of the type detailed above and the corresponding descriptions and encode the data structures on a computer-readable medium. Those of skill in the art of integrated circuit fabrication can use such encoded data to fabricate integrated circuits comprising one or more of the circuits described herein.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A method, performed by an electronic device, for tracking power states of a mouse operatively coupled to the electronic device, the method comprising:
   receiving, from the mouse, electromagnetic signals representing episodic bursts of data that describe motion of the mouse, wherein the electromagnetic signals representing the episodic bursts of data that describe the motion of the mouse are received over a wireless interface;
   inferring, from the received electromagnetic signals representing the episodic bursts of data that describe the motion of the mouse, an operating mode of the mouse, the operating mode including at least one active operating mode and at least one idle operating mode, wherein the inferring is based on:
      at least one of a duration of at least one burst of data and a duration between bursts of data; and
      an elapsed time as the mouse cascades through a plurality of low power sub-states of the at least one idle operating mode;
   calculating an accumulation of time that the mouse is in each operating mode and in each low power sub-state;
   determining a power-consumption history of the mouse based on the calculated accumulations of time;
   analyzing the power-consumption history to determine an estimate of remaining mouse battery life; and
   providing the determined estimate to a user of the electronic device.

2. The method of claim 1, further comprising modifying a user experience of the electronic device based on the power-consumption history, wherein modifying the user experience comprises analyzing the power consumption history to detect unusual operating conditions and taking remedial action.

3. The method of claim 2 wherein the remedial action is selected from the group consisting of: resetting firmware, logging a bug, and logging an error message.

4. The method of claim 1, wherein the episodic bursts of data from the mouse further describe the user's multi-touch gestures on the mouse.

5. An electronic device comprising:
   a communication subsystem comprising a wireless interface configured to receive, from a mouse, electromagnetic signals representing episodic bursts of data that describe motion of the mouse;
   a processing subsystem configured to:
      receive, from the communication subsystem, the episodic bursts of data that describe the motion of the mouse;
      infer, from the received episodic bursts of data, an operating mode of the mouse, the operating mode including at least one active operating mode and at least one idle operating mode, wherein the inference is based on:
         at least one of a duration of at least one burst of data and a duration between bursts of data; and
         an elapsed time as the mouse cascades through a plurality of low power sub-states of the idle operating mode;
      calculate an accumulation of time that the mouse is in each operating mode and each low power sub-state;
      determine a power-consumption history of the mouse based on the calculated accumulations of time;
      analyze the power consumption history to determine an estimate of remaining mouse battery life; and
      provide the determined estimate to a user of the electronic device.

6. The electronic device of claim 5, wherein the processing subsystem is further configured to modify a user experience of the electronic device based on the power-consumption history, wherein modifying the user experience comprises analyzing the power consumption history to detect unusual operating conditions and take remedial action.

7. The electronic device of claim 6 wherein the remedial action is selected from the group consisting of: resetting firmware, logging a bug, and logging an error message.

8. The electronic device of claim 5, wherein the episodic bursts of data from the mouse further describe the user's multi-touch gestures on the mouse.

9. A method, performed by an electronic device, for tracking power states of a trackpad operatively coupled to the electronic device, the method comprising:
   receiving, from the trackpad, electromagnetic signals representing episodic bursts of data that describe motion of a user's contact with the trackpad;
   inferring, from the received electromagnetic signals representing the episodic bursts of data that describe the motion of the user's contact with the trackpad, an operating mode of the trackpad, the operating mode including at least one active operating mode and at least one idle operating mode, wherein the inferring is based on:
      at least one of a duration of at least one burst of data and a duration between bursts of data; and
      an elapsed time as the trackpad cascades through a plurality of low power sub-states of the idle operating mode;
   calculating an accumulation of time that the trackpad is in each operating mode and in each low power sub-state;
   determining a power-consumption history of the trackpad based on the calculated accumulations of time; and
   modifying a user experience of the electronic device based on the determined power consumption history.

10. The method of claim 9,
   wherein the electronic device comprises a power source, and
   wherein modifying the user experience of the electronic device comprises changing an operating time of the electronic device before the power source is recharged.

11. The method of claim 9, wherein modifying the user experience of the electronic device comprises changing a clock speed or a backlight intensity of the electronic device.

12. The method of claim 9, wherein modifying the user experience comprises analyzing the power consumption history to detect unusual operating conditions and taking remedial action.

13. The method of claim 12 wherein the remedial action is selected from the group consisting of: resetting firmware, logging a bug, and logging an error message.

14. An electronic device comprising:
a communication subsystem configured to receive, from a trackpad, electromagnetic signals representing episodic bursts of data that describe motion of a user's contact with the trackpad;
a processing subsystem configured to:
  receive, from the communication subsystem, the episodic bursts of data from the trackpad that describe the motion of the user's contact with the trackpad;
  infer an operating mode of the trackpad from the received episodic bursts of data, the operating mode including at least one active operating mode and at least one idle operating mode, wherein the inference is based on:
    at least one of a duration of at least one burst of data and a duration between bursts of data; and
    an elapsed time as the trackpad cascades through a plurality of low power sub-states of the idle operating mode;
  calculate an accumulation of time that the trackpad is in each operating mode and in each low power sub-state;
  determine a power-consumption history of the trackpad based on the calculated accumulations of time; and
  modify a user experience of the electronic device based on the determined power consumption history.

15. The electronic device of claim 14,
wherein the electronic device comprises a power source, and
wherein modifying the user experience of the electronic device comprises changing an operating time of the electronic device before the power source is recharged.

16. The electronic device of claim 14, wherein modifying the user experience of the electronic device comprises changing a clock speed or a backlight intensity of the electronic device.

17. The electronic device of claim 14, wherein the bursts of data from the trackpad further describe the user's multi-touch gestures with the trackpad.

18. The electronic device of claim 14 wherein modifying the user experience comprises analysing the power consumption history to detect unusual operating conditions and take remedial action.

19. The electronic device of claim 18 wherein the remedial action is selected from the group consisting of: resetting firmware, logging a bug, and logging an error message.

* * * * *